US008625667B2

(12) United States Patent
Cilli et al.

(10) Patent No.: US 8,625,667 B2
(45) Date of Patent: Jan. 7, 2014

(54) METHOD OF OPPORTUNITY-BASED TRANSMISSION OF WIRELESS VIDEO

(75) Inventors: Bruce R. Cilli, Atlantic Highlands, NJ (US); Charles Payette, Oceanport, NJ (US)

(73) Assignee: Alcatel Lucent, Paris (FR)

( * ) Notice: Subject to any disclaimer, the term of this patent is extended or adjusted under 35 U.S.C. 154(b) by 401 days.

(21) Appl. No.: 12/938,486

(22) Filed: Nov. 3, 2010

(65) Prior Publication Data

US 2011/0129011 A1    Jun. 2, 2011

Related U.S. Application Data

(60) Provisional application No. 61/265,121, filed on Nov. 30, 2009.

(51) Int. Cl.
*H04N 11/02* (2006.01)
(52) U.S. Cl.
USPC ....................................................... 375/240.1
(58) Field of Classification Search
None
See application file for complete search history.

(56) References Cited

U.S. PATENT DOCUMENTS

| | | | |
|---|---|---|---|
| 6,510,177 B1 * | 1/2003 | De Bonet et al. | 375/240.16 |
| 2002/0021761 A1 * | 2/2002 | Zhang et al. | 375/240.27 |
| 2002/0116473 A1 * | 8/2002 | Gemmell | 709/219 |
| 2003/0118097 A1 | 6/2003 | Chen et al. | |
| 2006/0023748 A1 | 2/2006 | Chandhok et al. | |
| 2007/0009039 A1 * | 1/2007 | Ryu | 375/240.16 |
| 2007/0013561 A1 * | 1/2007 | Xu et al. | 341/50 |
| 2007/0101387 A1 | 5/2007 | Hua et al. | |
| 2008/0068446 A1 * | 3/2008 | Barkley et al. | 348/14.07 |
| 2008/0069242 A1 * | 3/2008 | Xu et al. | 375/240.24 |
| 2009/0034629 A1 * | 2/2009 | Suh et al. | 375/240.27 |

FOREIGN PATENT DOCUMENTS

| | | |
|---|---|---|
| EP | 1 233 591 A2 | 8/2002 |
| WO | 2008/027724 A1 | 3/2008 |
| WO | PCT/US2010/056106 | 7/2011 |

OTHER PUBLICATIONS

S. Wenger, Y.K. Wang, T. Schierl, A. Eleftheriadis—RTP Payload Format for SVC Video—Apr. 26, 2010—105 pages.
T. Schierl, Fraunhofer Hhi, S. Wenger—Signaling Media Decoding Dependency in the Session Description Protocol—Jul. 2009—19 pages.
Rejaie R et al: "Mocha: A Quality Adaptive Multimedia Proxy Cache for Internet Streaming", Proceedings of the 11th. International Workshop on Network and Operating Systems Support for Digital Audio and Video. Nossdav 2001. Port Jefferson, NY, Jun. 25-26, 2001; [Proceedings of the International Workshop on Network and Operating System Sup, Jun. 25, 2001, pp. 3-10, XP001134291, DOI: DOI:10.1145/378344.378345 ISBN: 978-1-58113-370-7 the whole document.

* cited by examiner

*Primary Examiner* — Joseph Ustaris
*Assistant Examiner* — Zhubing Ren
(74) *Attorney, Agent, or Firm* — Wall & Tong, LLP

(57) ABSTRACT

A method is provided to efficiently transport video signals on a wireless network when resources are scarce. In an embodiment, a user's mobile terminal codes the video in multiple layers. If resources are scarce, the mobile terminal reduces current bandwidth requirements by streaming a subset, i.e., one or more of the lower coded video layers only. This streamed video can be viewed by peers and saved on a server. Meanwhile, the higher layers that were not sent are saved on the mobile device. When network resources eventually become available, the saved higher layers only are sent to the destination server that saved the lower layers. The entire video can then be reconstructed on the destination server.

19 Claims, 4 Drawing Sheets

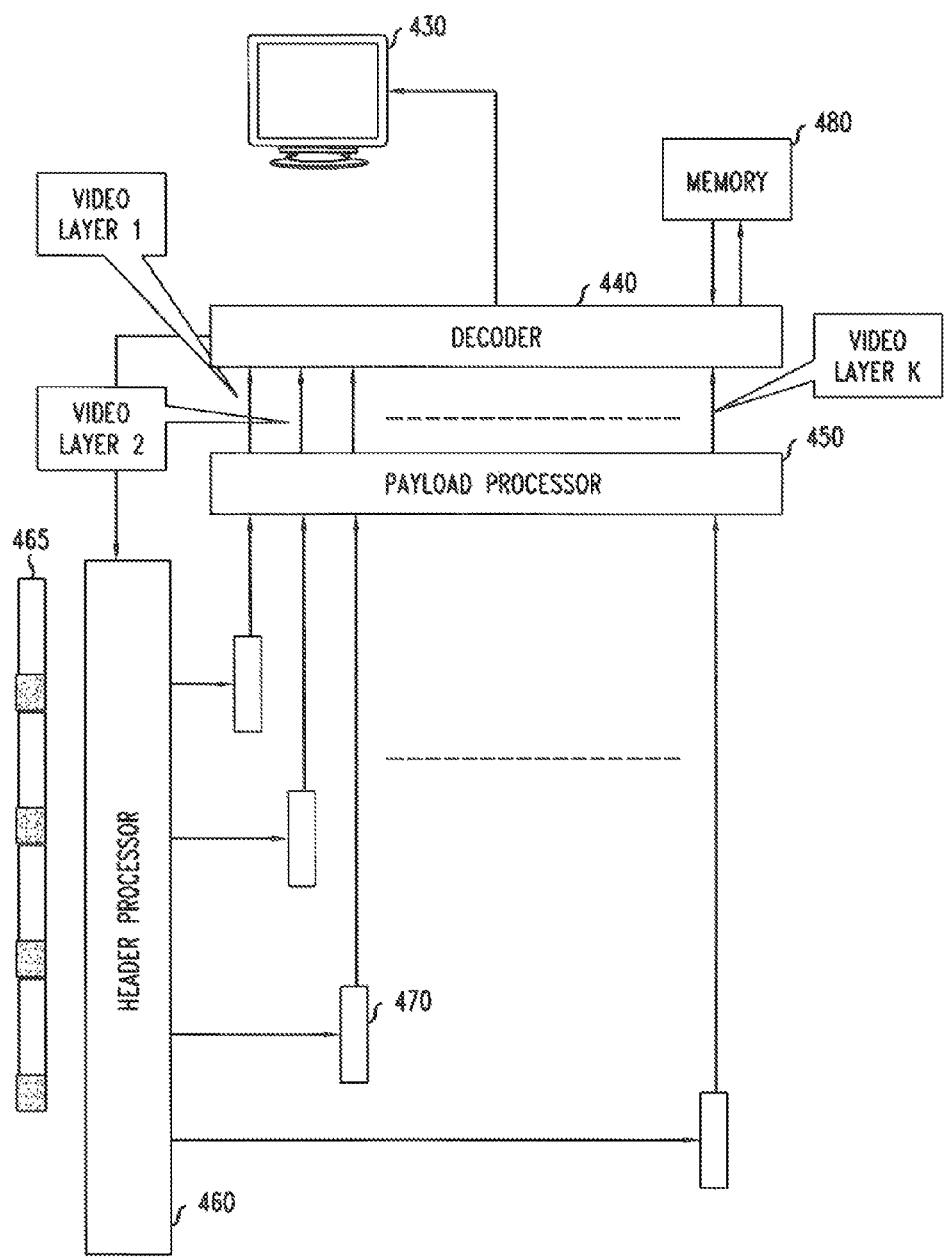

METHOD OF OPPORTUNITY-BASED TRANSMISSION OF WIRELESS VIDEO

CROSS-REFERENCE TO RELATED APPLICATIONS

This application claims priority pursuant to 35 U.S.C. Sec 119(e) to U.S. Provisional Application No. 61/265,121, filed Nov. 30, 2009, entitled "METHOD OF OPPORTUNITY-BASED TRANSMISSION OF WIRELESS VIDEO," the subject matter thereof being fully incorporated herein by reference.

The subject matter of this application is related to the subject matter of the commonly owned U.S. patent application Ser. No. 12/702,722, filed Feb. 9, 2010, entitled "SYSTEM AND METHOD OF WIRELESS UPLINK VIDEO TRANSMISSION".

The subject matter of this application is related to the subject matter of the commonly owned U.S. application Ser. No. 12/793,213, filed Jun. 3, 2010, entitled "METHOD OF PRIORITY BASED TRANSMISSION OF WIRELESS VIDEO."

ART BACKGROUND

Wireless access links, such as those provided by 3G and 4G networks, are shared, limited resources and as such may become scarce as demand outstrips supply. As a consequence, contention will arise when too many users attempt to transmit data from their mobile devices within the same sector. Until recently, users predominantly uploaded considerably less data than they would download. However, the recent introduction of video-enabled mobile devices is likely to stimulate rapidly growing demand for uplink bandwidth.

For this and other reasons, there is a growing need for mechanisms to reduce bandwidth requirements for over-the-air video transmission and effectively manage transmission resources, particularly the uplink resource. In particular, there is a need for flexible methods of video transmission that can provide enough quality to satisfy user needs while consuming relatively little bandwidth during times when resources are scarce, and can provide higher quality when resources are more plentiful.

SUMMARY OF THE INVENTION

The H.264 Scalable Video Codec (SVC) provides a mechanism to encode video in multiple layers, including a base layer and one or more additional layers. Transmitting the base layer is sufficient to allow the receiver to decode a viewable video signal, but each additional layer adds to the quality of the decoded signal. For example, the different layers may represent video that has been coded at different levels of quality in such a way that data and decoded samples of lower qualities can be used to predict data or samples of higher qualities.

We have developed a method to efficiently transport video signals that can be used when resources are scarce, for example when a wireless network is experiencing peak demand. In accordance with implementations of our approach, a user's mobile terminal codes the video in multiple layers, as described above. If it is not expected that all the layers can be transmitted from the mobile device because of resource limitations over-the-air, the mobile terminal acting according to our method reduces current bandwidth requirements by streaming a subset, i.e., one or more of the lower coded video layers only. This streamed video can be viewed by peers and saved on a server. Meanwhile, the higher layers that were not sent are saved on the mobile device. When network resources eventually become available, the saved higher layers only are sent to the destination server that saved the lower layers. The entire video can then be reconstructed on the destination server. The user will then have the entire video saved at high quality.

BRIEF DESCRIPTION OF THE DRAWING

FIG. 4 is a conceptual block diagram of a mobile phone or other user terminal useful for practicing the invention in at least some embodiments. In contrast to FIG. 1, where features useful for the transmission of video are emphasized, FIG. 3 emphasizes features useful for the reception of video. The features of FIGS. 1 and 3 may of course be combined in one device.

DETAILED DESCRIPTION

Figure 1:
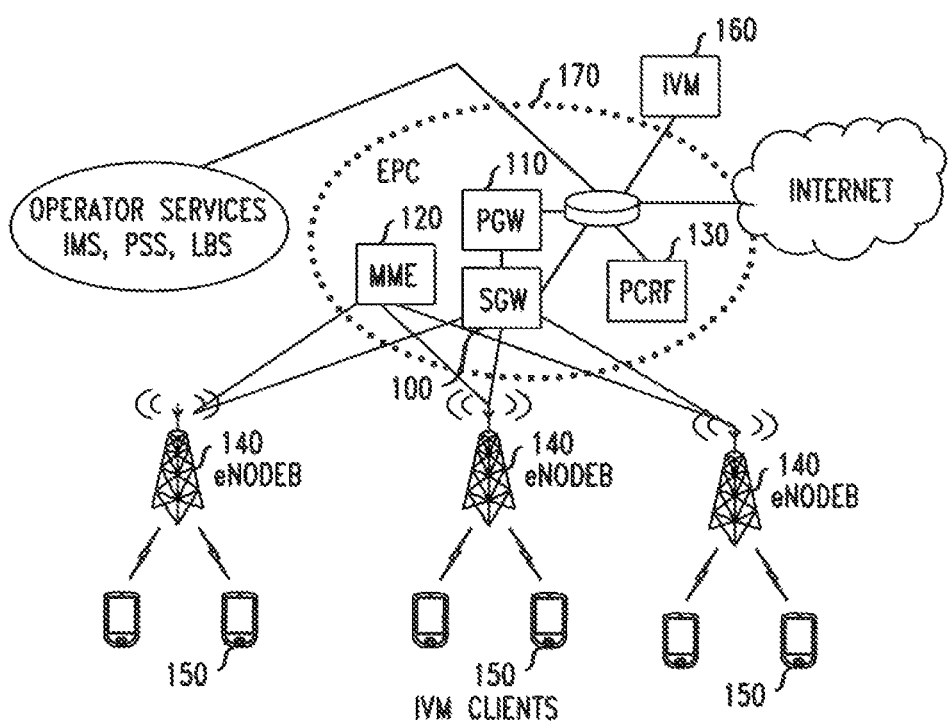
FIG. 1 is a block diagram of an Evolved Packet Core network including an Intelligent Video Masher (IVM) as described below.

As will be apparent from the foregoing discussion, our method can be used in a video streaming application. The user can stream video from a mobile device to peers in real time at lower quality when the network is experiencing high usage. The remaining video layers that are not sent in real time are sent later so that the reconstructed high quality video can be stored in the recipients' personal storage.

Accordingly, the later-sent video layers are transmitted at a time which is at least partially independent of the time of the initial transmission. That is, the timing of the later transmission is not completely determined by the timing of the initial transmission, as would be the case if, e.g., the transmissions were required to be concurrent or juxtaposed in time. Instead, the timing of the later transmission is determined, at least in part, by at least one factor that is independent of the timing of the initial transmission. Such a factor may be, for example, an indication of more favorable network conditions. One example of "partially independent timing" would be a policy to transmit the further layers at the earliest indication, subsequent to the initial transmission, that network conditions have surpassed a threshold.

Limiting the number of layers that are transmitted can ensure that the over-the-air interface is utilized most efficiently. It should be noted in this regard that as an alternative to sending over a wireless network such as a WiMax or LTE network, it would also be possible to send the higher layers over WiFi or other technologies to similarly reduce bandwidth on the over-the-air interface. This would not only save bandwidth consumption for the network operator but this could save the user streaming video from charges associated with metered billing for bandwidth usage.

It should also be noted that our method promotes efficiency in bandwidth utilization because it obviates the need to retransmit entire video signals. That is, as noted above, after the lower layer or layers have been sent, it is sufficient if only the higher layers are sent in subsequent transmissions.

Software, e.g. client software running on the mobile phone, determines how many layers to transmit at a given time. To make this determination, the client software may use information about channel quality received from the base station. Channel quality information may include, without limitation, any of channel quality indices, signal to interference and noise ratios, error rates, and power levels. (In other implementations, the software that schedules the transmission of layers may run on a device external to the mobile phone, such as a server at the base station, elsewhere in the radio access network, or in the core network. In one particular example, the software that schedules the transmission of layers runs on an Intelligent Video Masher, as described below.)

The mobile station identifies the various video streams to the receiver, so that they can be correlated and recombined. (In some cases, earlier-received video streams will need to be combined with higher-layer streams that arrive after a significant delay.) For example, the Session Description Protocol (SDP) can provide the mobile terminal with a message format for notifying the receiver of the type of media being transmitted. Thus, for example, the mobile can notify the receiver that instead of conventional video streams under H.264 SVC, the media being transmitted include multiple video layers that are transmitted at different times and are to be combined as described here. SDP is described in the Internet Engineering Task Force (IETF) publication RFC 5583, which is discussed in greater detail below.

Additionally, SVC, for example, includes a feature referred to as a Network Abstraction Layer (NAL) header. The NAL headers can be used to identify and correlate the individual video layers to which each respective bitstream belongs. A decoder as prescribed under the H.264 SVC standard is able to use the information in the NAL headers for combining the various video streams so that the video content can be rendered at a higher quality.

In an example scenario, a user streams video from his mobile phone, which may for example be a smartphone. The phone includes a video encoder. The video encoder applies H.264 SVC to produce multiple coded layers, which may, e.g., be assigned a port number for streaming to their destination.

As will be understood by those skilled in the art, the TCP and UDP protocols may apply if the video streaming is conducted according to the IP suite of protocols. At least in such cases, the port numbers will typically be TCP port numbers or UDP port numbers.

The receiver rebuilds a composite coded video signal from the various video layers that have been received. (The receiver can use SDP, for example, to identify those incoming video streams that are related.) For example, the composite signal may be rebuilt by jointly decoding the individual video layers according to well-known standards such as H.264 SVC. The rebuilt, coded signal may then be conditioned for rendering of the video content. (The output of the rendering process is a signal capable of driving a video display.)

As noted above, SDP is described in RFC 5583, "Signaling Media Decoding Dependency in the Session Description Protocol (SDP)," July 2009, http://tools.ietf.org/html/rfc5583.

Very briefly, RFC 5583 provides a signaling method by which the nodes in an IP network using the Real-Time Transport Protocol (RTP) can inform each other of the decoding dependencies of media bitstreams that are to be transmitted. (A media bitstream is a valid, decodable stream that conforms to a media coding standard.) In particular, RFC 5583 describes the signaling of such decoding dependencies for layered media bitstreams. It should be noted in this regard that an. SDP session description may contain one or more media descriptions. Each media description may identify one media stream. A layered media bitstream includes one or more media partitions, each conveyed in its own media stream.

A media partition is part of a media bitstream which is intended for independent transportation, and which may represent one or more layers that are to be handled as a unit. A decoding dependency is a type of relationship between media partitions. In the case of a layered decoding dependency, each media partition can be decoded only when the media partitions on which it depends are also available.

Various types of devices may serve as the receiver that is the destination for the streamed video. Of course one such entity is the fixed or mobile terminal belonging to a network user. Another example is a video server that receives the various layers and caches them until it can reconstitute the full transmission and retransmit it to the ultimate destinations. Such a video server may reside at any of various locations in the wireless network, including in the core network.

It should be noted in this regard that cacheing is only one type of storage that is useful in this regard. Cacheing is a short-term type of storage useful, e.g., to hold partial content until it is feasible to retransmit it in the full transmission. On the other hand, longer-term storage may be used, e.g., to hold the various layers until there is a request to retransmit them on-demand. Furthermore, the various coded video layers may be jointly decoded or transcoded to create a non-layered representation of the video content, and that non-layered representation may be held in cache, or in longer-term storage, until retransmission is feasible or until it is requested.

It should be noted further that instead of decoding, the various coded video layers may be jointly transcoded to create a coded video representation that is non-layered. For example, techniques for transcoding from a layered SVC representation to a non-layered AVC representation are well known. Transcoding is particularly useful because in many instances, it may be more efficient to transmit non-layered coded video than it is to transmit layered coded video.

It should also be noted that in a receiver, a video signal may be rendered at the time of receipt of the initial transmission, containing the base layer, and that further coded video layers may be received subsequently. In such a case, if the initially received layers have been stored, e.g. in a cache memory, they can be decoded or transcoded a second (or further) time, as inputs to the joint decoding or transcoding of the full video signal.

One example of a video server residing in the core network is the entity that we refer to as an Intelligent Video Masher (IVM). For example, the IVM may be included in the core network of a wireless communication system the supports LTE. LTE is a Fourth Generation enhancement to UMTS telecommunication that includes an all-IP networking architecture. LTE is being introduced through a series of releases by the 3rd Generation Partnership Project (3GPP). In LTE, the GPRS core network is replaced by the System Architecture Evolution (SAE), which is a flat, IP-based network architecture. Because LTE is all-IP from end to end, the mobile handsets and other terminal devices for LTE have embedded IP capabilities, and the base stations, referred to as Evolved NodeBs (eNodeBs), are IP-based. The IVM will typically be implemented as a server running on an appropriate host machine, and in particular it will be able to perform video processing, such as H.264 SVC processing, so that it can process the video bitstreams.

FIG. 1 illustrates the Evolved Packet Core (EPC) 170, which is the main architectural component of SAE. It will be seen from the figure that the EPC comprises four elements: the Serving Gateway (SGW) 100, the Packet Data Network Gateway (PGW) 110, the Mobility Management Entity (MME) 120, and the Policy and Charging Rules Function (PCRF) 130. The SCW, PGW, and MME were introduced in 3GPP Release 8, and the PCRF was introduced in 3GPP Release 7.

The SGW is a data plane element. Its primary function is to manage user-plane mobility and to act as a demarcation point between the radio access network (RAN) and the core networks. The SGW maintains data paths between eNodeBs 140 and the PGW.

The PGW is the termination point of the packet data interface toward the packet data networks. As such, it is the entry and exit point for traffic for the UEs 150, i.e., for the user terminals. The PGW supports operator-defined policy for resource allocation and usage, packet filtering, and charging.

The MME performs the signaling and control functions to manage the UE access to network connections, the assignment of network resources, and the management of the mobility states to support tracking, paging, roaming, and handovers, as well as all other control-plane functions related to subscriber and session management.

The PCRF supports service data flow detection, policy enforcement, and flow-based charging. (In LTE, a service data flow—SDF—is the virtual connection that carries data-plane traffic.)

With further reference to FIG. 1, it will be seen that the IVM 160 is situated, for example, just outside the EPC 170, where it can intercommunicate with the various EPC elements. More particularly, the IVM may be situated just outside the PGW 110, with which it communicates using known protocols of the Internet protocol suite. Higher protocol layers are used for the signaling and messaging that set up the video streaming. The IVM may reside on any of various hardware platforms, such as an ATCA platform.

Communication between the IVM and the various user terminals is effectuated by a protocol layer added on top of LTE. Such a protocol layer is readily added using known protocols, and need not be described here in detail.

Figure 2:
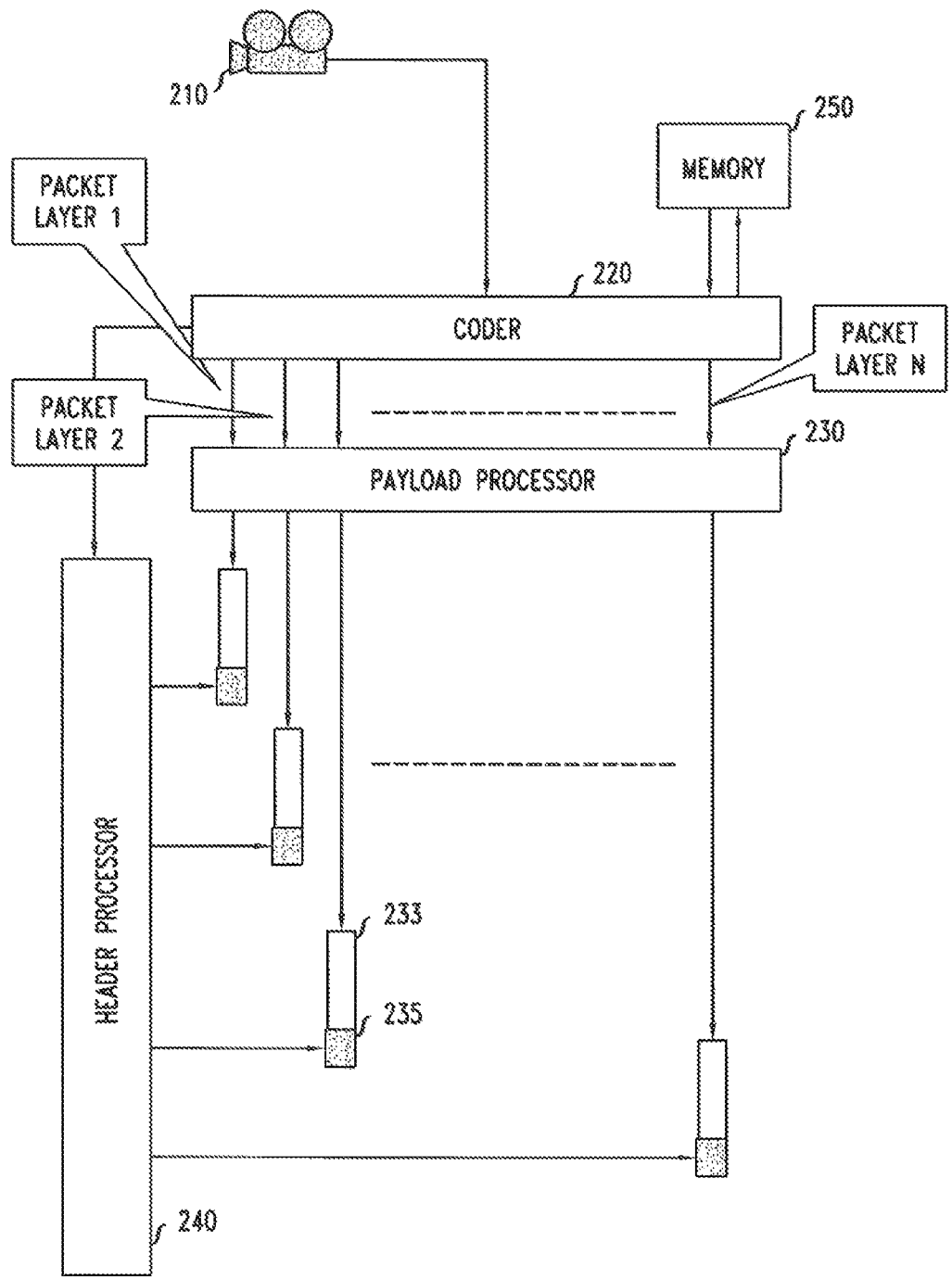
FIG. 2 is a conceptual block diagram of a mobile phone or other user terminal useful for practicing the invention in at least some embodiments.

Accordingly, as shown in FIG. 2, a mobile phone or other user terminal includes a video camera 210. The video stream from the camera enters a processor or processors, some of whose various functionalities are indicated in the figure as coder 220, payload processor 230, and header processor 240. This representation is meant to be purely conceptual, and it may have many different practical realizations in hardware and software, none of which are meant to be excluded. In general, however, at least one hardware processing device, such as a digital signal processor, will carry out the illustrated operations or their equivalent under appropriate control, which may be provided, e.g., by a program implemented in hardware, software, or firmware.

Coder 220 processes the video stream according, for example, to the H.264 SVC specification or other multilayer video protocol. This results in multiple outputs, each of which corresponds to one of several coding layers, as described above. The various coding layers are indicated in the figure as Packet Layer 1, Packet Layer 2, etc.

Payload Processor 230 assembles the coded data into packet payloads 233. Header information 235 must be appended to each of the packets. This header information is provided by Header Processor 240.

Storage of the individual coded video layers as discussed above is provided by memory 250.

Figure 3:
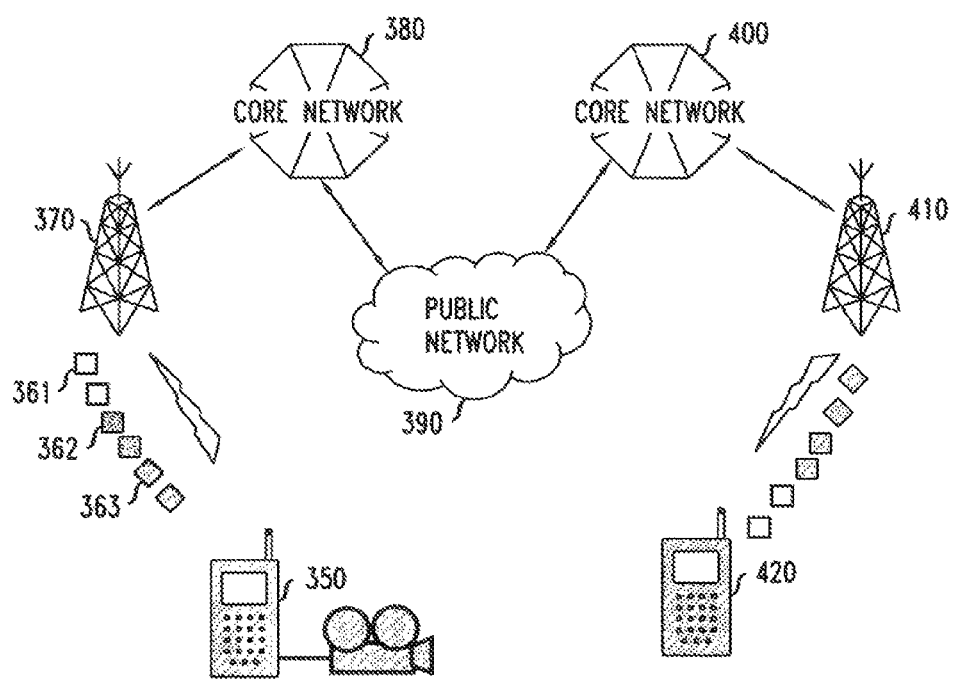
FIG. 3 is a conceptual block diagram of a wireless communication network in which the user terminal of FIG. 1 may be an element.

In an example scenario as illustrated in FIG. 3, a user 350 streams video from his mobile phone, which may for example be a smartphone. The phone includes a video encoder. The video encoder applies H.264 SVC to produce multiple coded layers. A processor in the phone assigns port numbers to the coded packets.

Packets 361, 362, 363 corresponding to the respective coded layers are transmitted, possibly at different times, to base station 370. (In particular, an initial transmission may include at least the base layer, and at least one further layer may be transmitted later.) Base station 370 transmits the packets to its core network 380, from which the packets are transmitted toward their destination through public network 390, which may, e.g., be the Internet. The public network delivers the packets to core network 400, which serves the user for whom the packets are destined. Core network 400 transmits the packets to base station 410, which transmits them to destination user 420.

The receiver reconstructs the video signal. The receiver is responsible for recombining these flows for input to the decoder. Ultimately, the decoder determines the structure of the layers based on the coding method, e.g., H.264 SVC.

In some embodiments, the video signal is reconstructed at a receiving user terminal, such as a mobile terminal. In other embodiments, the various video layers are saved at a device in the core network or in the access network, and when all layers are available, the device retransmits them together toward the final destination. The various layers may be retransmitted in the layered representation, or they may, for example, be transcoded for transmission in a non-layered representation.

Accordingly, as shown in FIG. 4, a mobile phone or other user terminal includes a video display device 430. The video stream to the display device is output from a processor or processors, some of whose various functionalities are indicated in the figure as decoder 440, payload processor 450, and header processor 460. This representation is meant to be purely conceptual, and it may have many different practical realizations in hardware and software, none of which are meant to be excluded. In general, however, at least one hardware processing device, such as a digital signal processor, will carry out the illustrated operations or their equivalent under appropriate control, which may be provided, e.g., by a program implemented in hardware, software, or firmware.

Header processor 460 extracts the header information from the received packets 465. Payload Processor 450 converts the packet payloads 470 into coded video streams in each respective layer. The various coded layers are indicated in the figure as Video Layer 1, Video Layer 2, etc. Decoder 440 processes the video streams according, for example, to the H.264 SVC specification or other multilayer video protocol in order to render the video signal that is provided to display device 430.

Storage of the individual coded video layers as discussed above is provided by memory 480.

What is claimed is:

1. A method for use at a mobile device adapted to communicate via a wireless access link, comprising:
    at the mobile device, coding a video signal as a base layer and one or more additional layers, wherein the base layer provides information sufficient to recover viewable video content and the one or more additional layers provide information adapted to improve viewable video content quality;
    determining a present capacity of said wireless access link;
    transmitting from the mobile device said base layer and an initial number of said additional layers via said wireless access link in an initial transmission, said initial number of said additional layers selected to ensure that said initial transmission is within said determined present capacity of said wireless access link;

storing at the mobile device only those portions of the base layer and additional layers not yet transmitted via said wireless link; and transmitting from the mobile device at least one of a remaining number of said additional layers stored at the mobile device via said wireless access link as sufficient wireless link capacity becomes available.

2. The method of claim 1, wherein at least one said delayed transmission is performed after detecting a favorable change in network conditions.

3. The method of claim 1, wherein at least one said delayed transmission is at least partially independent in time from the initial transmission.

4. A method, comprising:

receiving, from a link of a communication network, one or more coded video layers including a coded video base layer providing information sufficient to recover viewable video content and an initial number of additional layers providing information adapted to improve viewable video content quality;

retransmitting the base layer and a a portion of the initial number of said additional layers toward a destination;

storing only those portions of the base layer and the initial number of the additional layers not yet retransmitted toward said destination;

receiving, from the link of the communications network, any remaining number of additional layers;

storing only those portions of any remaining number of the additional layers not yet retransmitted toward said destination; and retransmitting a number of the additional layers that were stored toward said destination.

5. The method of claim 4, wherein the storing comprises caching the one or more coded video layers.

6. The method of claim 4, wherein the storing comprises storing the one or more coded video layers for on-demand retransmission.

7. The method of claim 4, wherein the retransmission of said layers is performed in one streaming session.

8. The method of claim 4, wherein the retransmission of the additional layers is performed in response to an indication that channel conditions are favorable.

9. The method of claim 4, wherein the one or more coded video layers including a coded video base layer are received during an initial transmission, and the one or more additional coded video layers are received during a later transmission that is at least partially independent in time from the initial transmission.

10. The method of claim 4, wherein the link of a communication network is a wireless access link.

11. The method of claim 4, wherein retransmitting the stored layer or layers and the additional layer or layers comprises streaming said stored and additional layers to a destination.

12. A method, comprising:

receiving, from a wireless access link, one or more coded video layers including a coded video base layer that provides information sufficient to recover viewable video content and an initial number of additional layers that provide information adapted to improve viewable video content quality;

receiving any remaining number of additional layers;

creating a non-layered representation of the video content by, jointly transcoding the base layer and the additional layers; and storing only those portions of said base layer and additional layers not yet transcoded to provide said non-layered representation of the video content.

13. The method of claim 12, further comprising storing the non-layered representation of the video content; and transmitting the non-layered representation of the video content to at least one user in response to a download request.

14. The method of claim 12, further comprising storing the non-layered representation of the video content; and streaming the non-layered representation of the video content to at least one user.

15. The method of claim 12, further comprising rendering the non-layered representation of the video content.

16. The method of claim 12, wherein one or more of the stored layers have been previously decoded and rendered to provide a video display without the additional layers, so that the joint decoding step constitutes at least a second decoding of said one or more stored layers.

17. The method of claim 12, wherein the creating step comprises jointly transcoding the stored layer or layers and the additional layer or layers to create a non-layered coded video signal.

18. The method of claim 1, further comprising transmitting from the mobile device at least one of the remaining number of said additional layers stored at the mobile device via a second wireless access link.

19. The method of claim 18, wherein said second wireless access link comprises a WiFi link.

\* \* \* \* \*